(12) United States Patent
Mahr et al.

(10) Patent No.: US 8,726,458 B1
(45) Date of Patent: May 20, 2014

(54) SOLAR COLLECTOR WASHING DEVICE

(76) Inventors: Scott Reinhold Mahr, Los Angeles, CA (US); Marc Alexander Grossman, Davis, CA (US)

(*) Notice: Subject to any disclaimer, the term of this patent is extended or adjusted under 35 U.S.C. 154(b) by 40 days.

(21) Appl. No.: 13/481,034

(22) Filed: May 25, 2012

Related U.S. Application Data

(60) Provisional application No. 61/490,393, filed on May 26, 2011.

(51) Int. Cl.
*E01H 1/08* (2006.01)
*G01C 22/00* (2006.01)
*G05D 1/00* (2006.01)

(52) U.S. Cl.
USPC .......................... 15/340.1; 701/26

(58) Field of Classification Search
USPC ...................... 701/25, 26; 15/340.1
See application file for complete search history.

(56) References Cited

U.S. PATENT DOCUMENTS

| | | | |
|---|---|---|---|
| 6,459,955 B1* | 10/2002 | Bartsch et al. | 700/245 |
| 2006/0060216 A1* | 3/2006 | Woo | 134/18 |
| 2009/0228165 A1* | 9/2009 | Ozick et al. | 701/23 |
| 2010/0206294 A1* | 8/2010 | Blair et al. | 126/600 |
| 2011/0137458 A1* | 6/2011 | Hisatani et al. | 700/248 |
| 2011/0258804 A1* | 10/2011 | Jaeger | 15/256.5 |

FOREIGN PATENT DOCUMENTS

WO    WO 2011/106665 A2    9/2011

* cited by examiner

*Primary Examiner* — Mary Cheung
*Assistant Examiner* — Frederick Brushaber
(74) *Attorney, Agent, or Firm* — Brooks Acordia IP Law, PC; Pejman Yedidsion; Christopher Weiss

(57) ABSTRACT

Methods and systems for cleaning a plurality of solar collectors by a cleaning device that may traverse the gap between a current solar collector and a proximate solar collector by controlling the interaction between the cleaning device and the plurality of solar collectors.

28 Claims, 12 Drawing Sheets

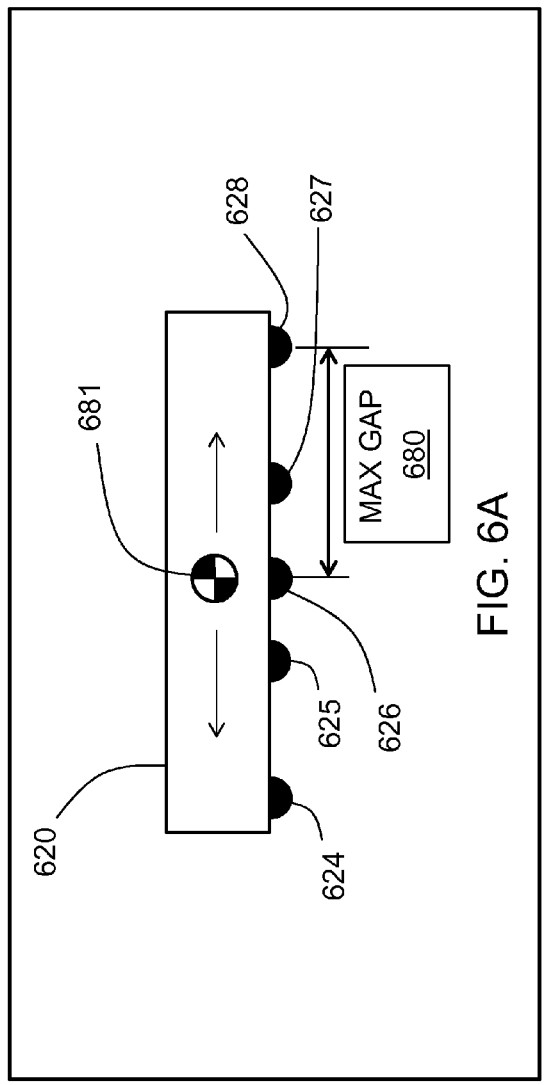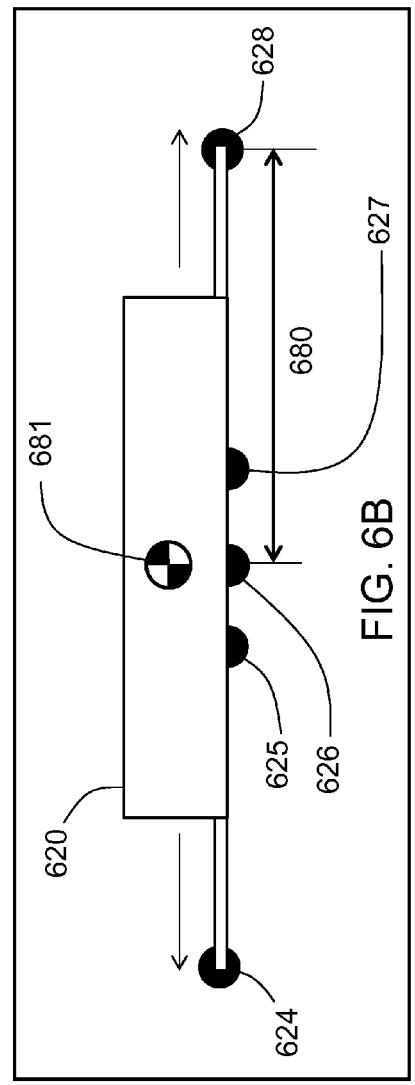

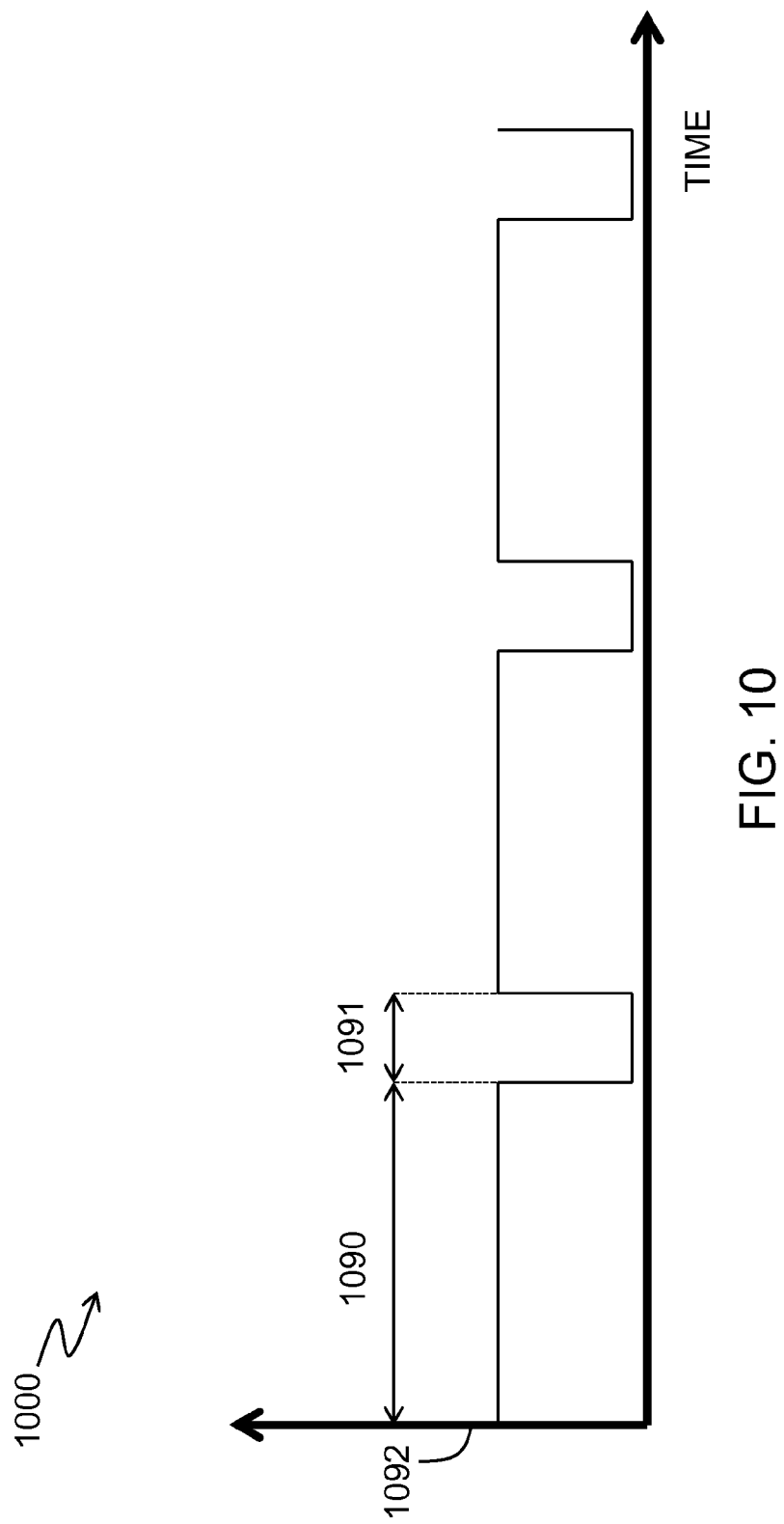

SOLAR COLLECTOR WASHING DEVICE

CROSS-REFERENCE TO RELATED APPLICATION

This application claims priority to and the benefit of U.S. Provisional Patent Application Ser. No. 61/490,393, filed May 26, 2011, which is hereby incorporated herein by reference in its entirety for all purposes.

TECHNICAL FIELD

The invention relates to the field of concentrated solar thermal and photovoltaic panel maintenance and more particularly to devices, systems, and methods for cleaning portions of solar collectors.

BACKGROUND

Heliostat arrays require cleaning to remove soiling and maintain efficiency. Existing cleaning devices are driven in between rows of heliostats and use pressurized water as a cleaning method. As a result, these devices have a large mass, may require ground leveling to avoid swaying of one or more reservoirs when in use, and require large amounts of water. Additionally, the presence of water on recently cleaned heliostats may attract dust prior to drying.

SUMMARY

Exemplary embodiments include a system comprising a plurality of solar collectors, each solar collector comprising a first surface, e.g., a front surface, the first surface defining an edge, and where the two or more opposing edges, i.e., a first edge of a first surface of a first solar collector and a first edge of a first surface of a second solar collector, define an open region, or a "gap," where the open region may be planar, singly curved, or complexly curved. A solar collector cleaning device may be configured to automatically traverse the first surface and the open region via a linear or curvilinear path in order to remove dirt from a surface of one or more solar collectors.

The term "dirt" is used herein to describe dust particles, small particles, inorganic films, organic films or other material that may reduce the transmissivity, and/or reflectivity, of the front surface of a solar collector. The term "gap" is used herein to describe an open region between a first solar collector and a second solar collector. Other exemplary embodiments include a means for controlling the interaction between the solar collectors and the device such as a wireless transceiver and a wireless protocol. In some exemplary embodiments, the solar collectors may be oriented in a curvilinear array and the device may comprise a plurality of drive elements, such as drive wheels, where the drive wheels may be configured to move the device when the device is disposed atop the surface of the one or more solar collectors. In an exemplary embodiment, the solar collectors may be configured to orient in a plane tangential to the local level, where a local level may be defined as any point of the surface of the earth where a coordinate frame such as a local north-east-down coordinate frame may be established, and the device may be disposed on the solar collectors. In another exemplary embodiment, the solar collectors may be configured to orient in various planes and the device may be disposed on the solar collectors.

Some exemplary embodiments include a system comprising a plurality of solar collectors, where each solar collector comprises a first surface, the first surface defines an edge, and wherein opposing edges of proximate solar collectors define an open region, or gap, and a solar collector cleaning device may be configured to automatically traverse the open region. Some exemplary embodiments of the device may comprise a chassis, a plurality of drive wheels attached to opposing ends of the chassis, a motor or other means for propulsion attached to the chassis, and a means for wireless communication. Some exemplary embodiments of the device may further comprise a fluid dispersal element attached to one end of the chassis, a fluid removal element attached to the chassis that may be distal to the fluid dispersal element, where the fluid removal element may be compressed for optimal contact with the solar collector, and a reservoir may be attached to the chassis wherein a conduit connects the reservoir to one or more fluid dispersal elements. A pump and/or valve may be disposed along the conduit and interposed between the fluid from the reservoir and the fluid to the one or more fluid dispersal elements. Driven by gravity and/or a pump, the reservoir may provide fluid to the one or more fluid dispersal elements continuously or intermittently via the interposed valve. The device may further comprise an agitator such as a sponge, or a rod with filaments, where filaments are understood to comprise either a rigid or semi-rigid assembly, e.g., a brush, a bundle of soft strips, and/or a synthetic cloth, that may be attached to the chassis, and may be interposed between a fluid dispersal element and a fluid removal element. In some embodiments, the fluid dispersal/removal elements and brush may be disposed and arranged on the underside of the chassis so that the vehicle may operationally clean a front surface while traveling on, i.e., traversing, the front surface in a forward direction, or in an aftward direction. Some exemplary embodiments of the device may further comprise one or more guide elements, such as guide wheels, that may be attached to the chassis.

Other exemplary embodiments may include a support cart, where one or more devices may be tethered to the support cart. Another exemplary embodiment may include a solar collector cleaning device traversing the front surface while structurally supported by a lateral edge of the solar collector upon which the device travels.

Exemplary process embodiments of the present invention include methods comprising: engaging a cleaning device with a solar collector; spraying a solar collector with a fluid; contacting the sprayed solar collector with a surface agitator to remove dirt from the solar collector and suspend the dirt in the fluid; and removing the mixture of fluid and dirt with a fluid removal device. The solar collector cleaning device may be disposed from the edge of the solar collector.

Additional exemplary embodiments include methods for moving a cleaning vehicle from one solar collector to another solar collector comprising: waiting for an initial solar collector and a final, adjacent, solar collector to be aligned for vehicle traversal before the vehicle moves toward the final solar collector, where the initial solar collector and the final, adjacent solar collector turn to align the initial solar collector with the final adjacent solar collector; traversing from an initial solar collector to the aligned adjacent final solar collector; waiting for the final solar collector to turn to be aligned with a next adjacent solar collector; and traversing analogously sets of adjacent solar collectors. The fluid removal element may comprise a squeegee that may be electromechanically or mechanically actuated.

Additional exemplary embodiments include methods of guiding a cleaning device to recharge via a power source or refill a cleaning fluid, reservoir e.g., a water reservoir, at a docking station. Some exemplary embodiments include methods of monitoring the quantity of solar collectors cleaned by the cleaning device in a time interval, and the method may track the field position of the cleaning device. Exemplary methods include tracking the real-time, or near real-time solar collector cleanliness. Accordingly, exemplary methods may not require operator input to track and/or determine which solar collectors were cleaned in a particular time interval. Embodiments of the exemplary methods may reduce the levelized cost of energy by incorporating additional information into the cleaning strategy including at least one of: power purchase agreement, time of year, site specific dirt accumulation rates, current weather, predicted weather, current power plant operation, and future power plant operation. Additional exemplary embodiments may be synchronized for morning startups to exploit the availability of naturally present surface condensation to reduce cleaning fluid needs, e.g., water drawn from a reservoir, and to reduce startup time of solar collectors.

Other exemplary embodiments include cleaning devices configured to receive guidance to a docking station, and the docking station may provide cleaning fluid for refilling an on-board fluid reservoir and/or the docking station may provide power for recharging or refueling the on-board power source. The docking station may be configured to swap, or exchange, charged batteries with depleted barriers of the docked cleaning device. The docking station may be a stationary device or a mobile device such as a vehicle. The docking station may be configured as a vehicle with a larger cleaning fluid reservoir and larger supply of energy used to refill/recharge the cleaning vehicle.

Other exemplary embodiments include a system that monitors the cleaning dates of every solar collector, or one or more subsets of all the solar collectors of an array, and incorporates such factors as wind speed, time of year, power purchase agreement terms, site-specific soiling rates, forecast weather, current and planned plant operation and others to reduce the amount of solar collectors cleaned in order to reduce cleaning costs while maintaining output. Additional sensor subsystems comprising the exemplary system may include RFID patches or sensors on one or more of the solar collectors and an RFID patch or sensor on the cleaning device. Additional sensor subsystems comprising the exemplary system may include barcodes or barcode readers on one or more of the solar collectors and a barcode or barcode reader on the cleaning device.

Other exemplary embodiments include a system configured to monitor the formation of condensation on the solar collectors and to direct the cleaning system to clean solar collectors using the accumulated condensation as a cleaning fluid. Removing the condensation will allow the plant to capture more energy because condensation on the solar collectors inhibits energy collection. For example, the condensation removal strategy may be optimized to remove condensation from a select portion of the field used primarily during startup conditions while the other portion of the solar collectors may track in a condensation-removal motion that presents the largest cross section to the sun accelerating the evaporation of the condensation, and do so before returning to normal tracking procedures.

BRIEF DESCRIPTION OF THE DRAWINGS

Embodiments are illustrated by way of example and not limitation in the figures of the accompanying drawings, and in which:

FIGS. 6A-6F depict embodiments arrangements of wheels and center of mass location of exemplary solar collector cleaning vehicles for traversing a gap;

FIG. 10 depicts an exemplary embodiment of tracking a cleaning vehicle location.

DETAILED DESCRIPTION

Figure 1:
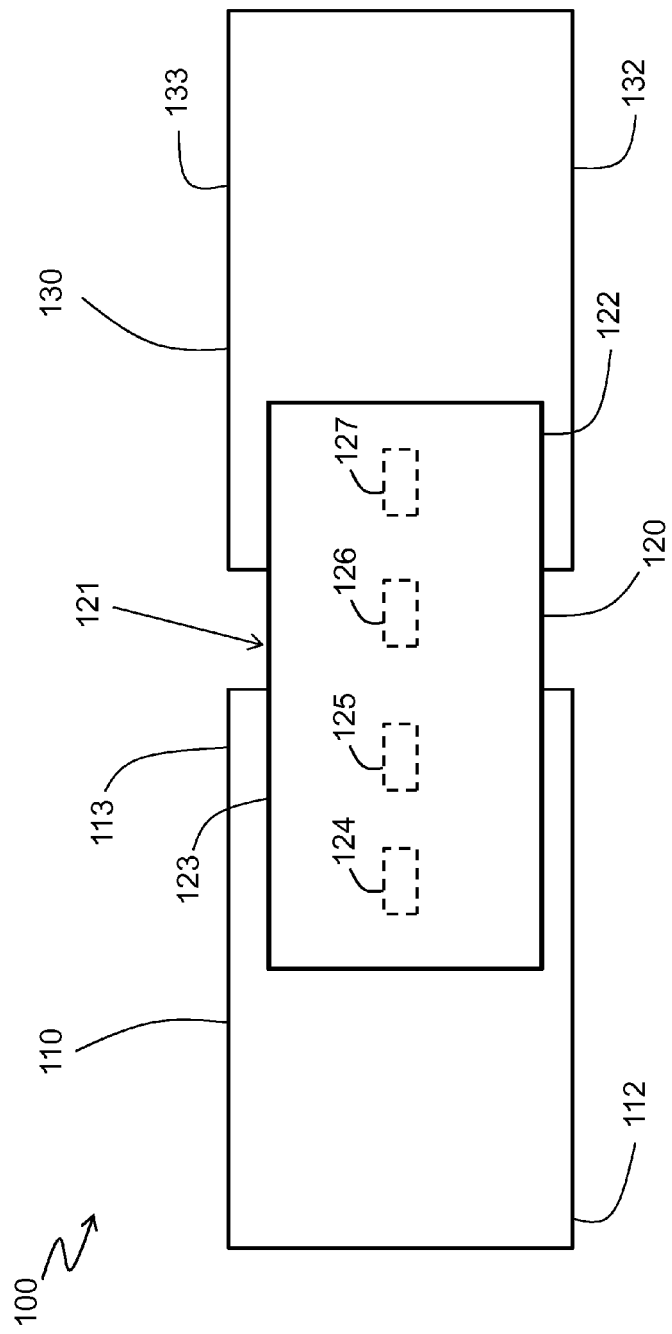
FIG. 1 depicts a top view of an exemplary embodiment of a solar collector cleaning vehicle interacting with solar collectors.

FIG. 1 illustrates a top level system comprising a plurality of solar collectors 110,130 that may be traversed by an exemplary embodiment of a cleaning vehicle 120. A solar collector is a reflector or lens for solar energy concentration or a solar panel (photovoltaic panel) for solar energy collection. The vehicle may comprise a chassis 121 configured to travel on and to traverse the gap between the solar collectors. In FIG. 1, a plurality of drive wheels 124-127 are shown on the bottom of the cleaning vehicle 120 allowing for the traversing of the solar collectors 110,130. In some embodiments there may be one or more guiding elements (not shown), e.g., guide wheels, that may extend from the vehicle chassis to about the edges of the solar collectors. Other embodiments may comprise at least one drive wheel in combination with at least one guide wheel, or any combination thereof. The sides of the chassis 122,123 may extend to be coextensive with, or extend beyond, the width of a solar collector, e.g., be coextensive with, or extend beyond the longitudinal edges 112,113,132, 133 of one or more, solar collectors 110,130. Embodiments of the cleaning vehicle may be capable of cleaning larger solar collectors, i.e., where the sides of the chassis may be less than coextensive with the longitudinal edges of each solar collector, and may include a turning radius, so an exemplary cleaning vehicle may turn and make multiple passes when cleaning larger solar collectors.

Embodiments of the solar collector cleaning device may be configured to maneuver via translative motion in any planar direction and/or along a surface having a curvature, e.g., via sliding to cut a new clean swath on a front surface of a solar collector. Exemplary solar collector cleaning vehicles may comprise a secondary set of drive wheels that may extend to move the vehicle in a path perpendicular to the present path, and the secondary wheels may retract after the translational maneuver is completed.

Figure 2:
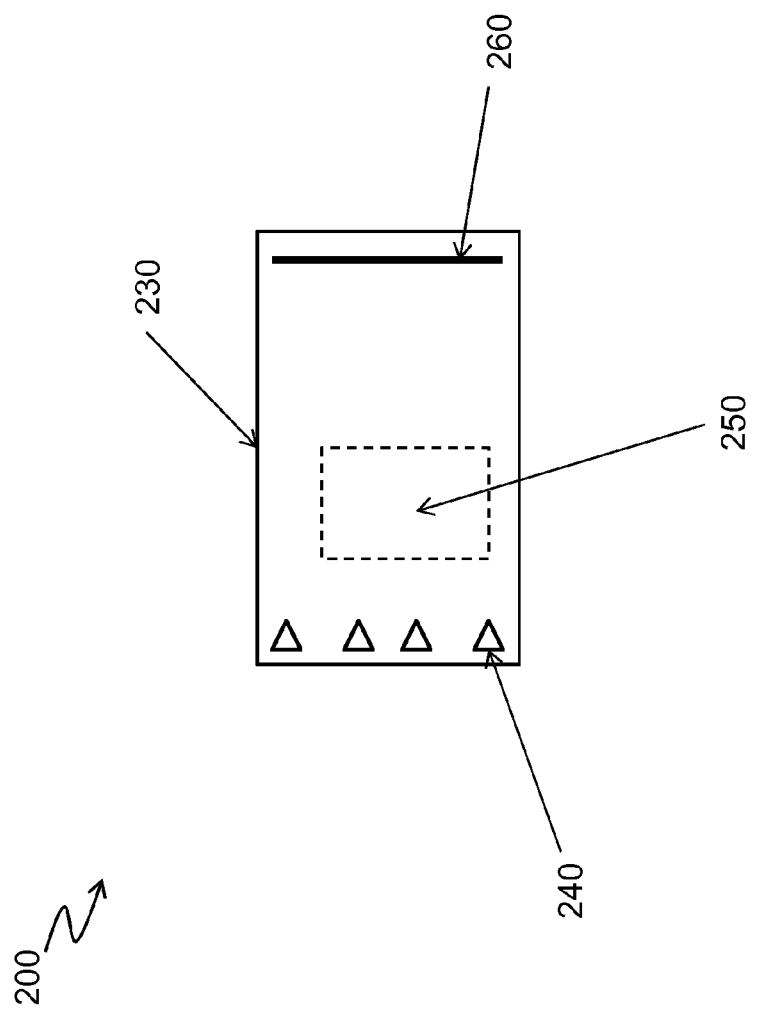
FIG. 2 depicts an exemplary embodiment of a cleaning vehicle shown from the underside of the chassis.

FIG. 2 illustrates an exemplary cleaning vehicle 200, in a view of the underside of the chassis 230, that may include one or more fluid dispersal elements 240. A fluid removal element 260, e.g., a squeegee, may be fixed distal to the fluid dispersal element 240. The cleaning vehicle 200 may include a chassis 230 that may comprise a reservoir 250 comprising a fluid, e.g., water. After being cleaned, a solar collector may be dry due to active cleaning fluid removal, thereby resulting in less dirt accumulation due to wind than an evaporatively dried surface. The cleaning vehicle or an off-board structure may comprise a fluid recovery system that may route used fluid to a filtering reservoir for reuse. Optionally, the fluid recovery system may be configured to use chemicals to aid in cleaning.

Figure 3:
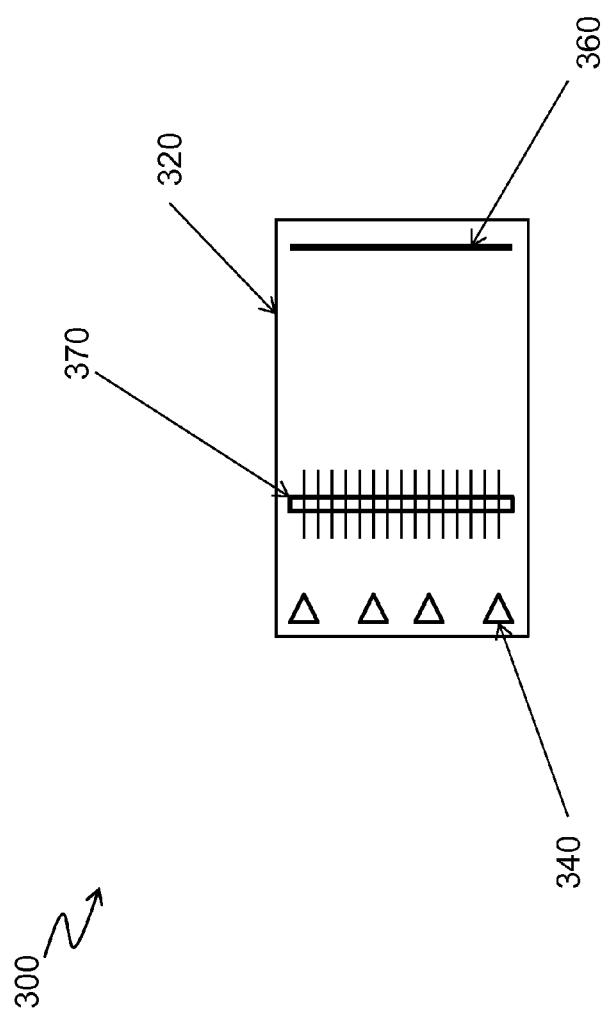
FIG. 3 depicts an exemplary embodiment of a cleaning vehicle shown from the underside of the chassis.

FIG. 3 illustrates an exemplary cleaning vehicle 300 where, a surface agitator 370, e.g., a rod with filaments, may be on a rotational shaft and may be interposed between a fluid dispersal element 340 and a fluid removal element 360, and disposed on the underside of the chassis 320. In some embodiments, the surface agitator 370 may comprise a reciprocating or rotating brush. The fluid dispersal element 340, fluid removal element 360, and rod with filaments 370, may be disposed on the undersurface of the chassis, proximate to a solar collector surface. The fluid dispersal element 340, fluid removal element 360, and rod with filaments 370, may also be disposed about the chassis 320 and may span across the surface of a solar collector.

Figure 4:
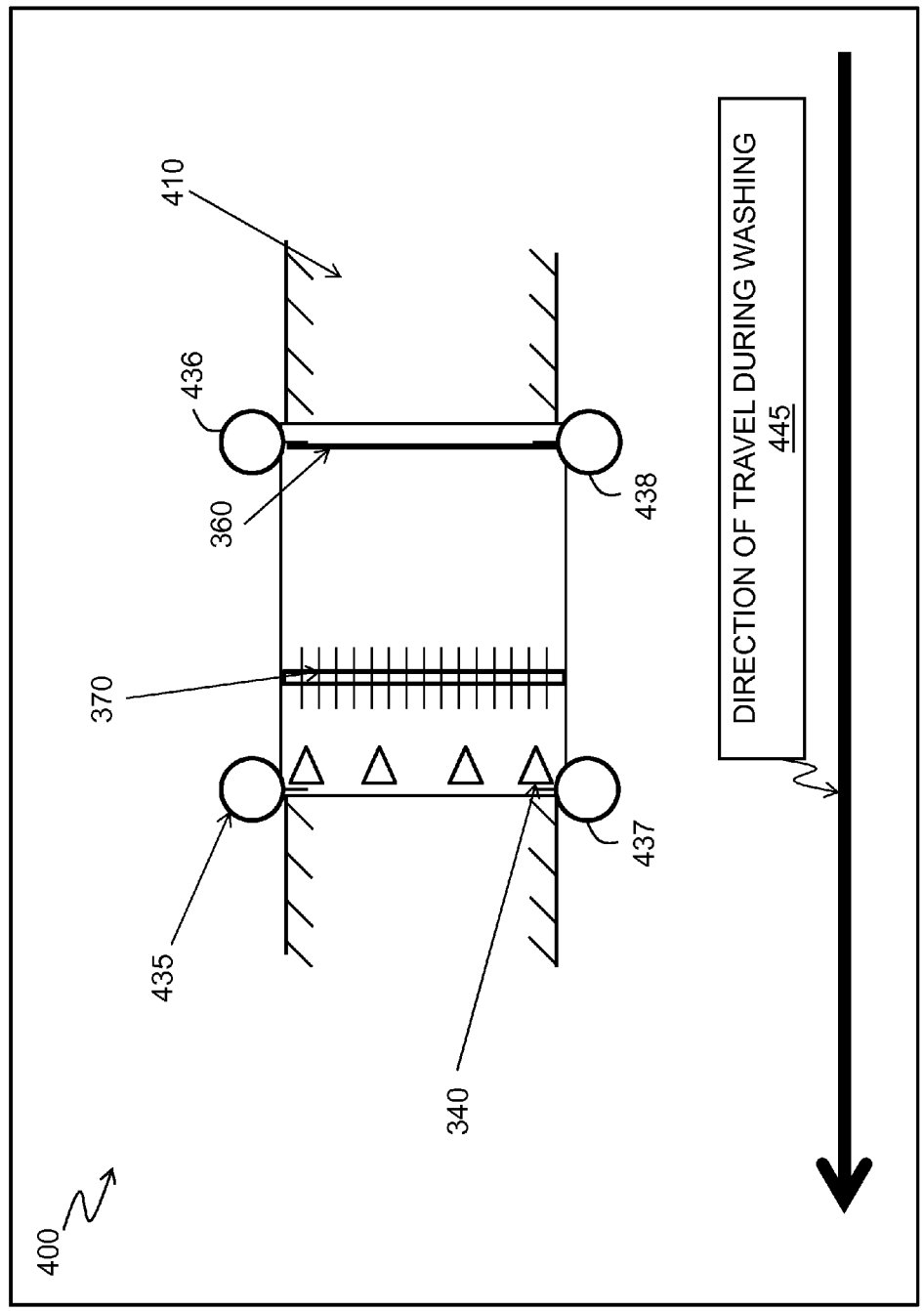
FIG. 4 depicts a top view of an exemplary embodiment of a cleaning vehicle showing disposed components of the underside of the chassis.

FIG. 4 depicts an exemplary cleaning vehicle 400, in a top view—illustrating the disposition of vehicle elements that may be proximate to a lower portion of the vehicle, i.e., proximate to a reflective surface of a solar collector. The exemplary components may be disposed on the underside of the chassis where one or more guiding elements 435,436,437,438, e.g., guide wheels, may help align the vehicle as it operates on a solar collector 410. In some embodiments, at least one guiding element may be used to guide the cleaning vehicle in the direction of travel 445. The guiding wheels may be disposed about the cleaning vehicle 400 so as to balance the vehicle. The guiding wheels may also be used to propel the cleaning vehicle and may be used in various solar collector orientations.

Figure 5:
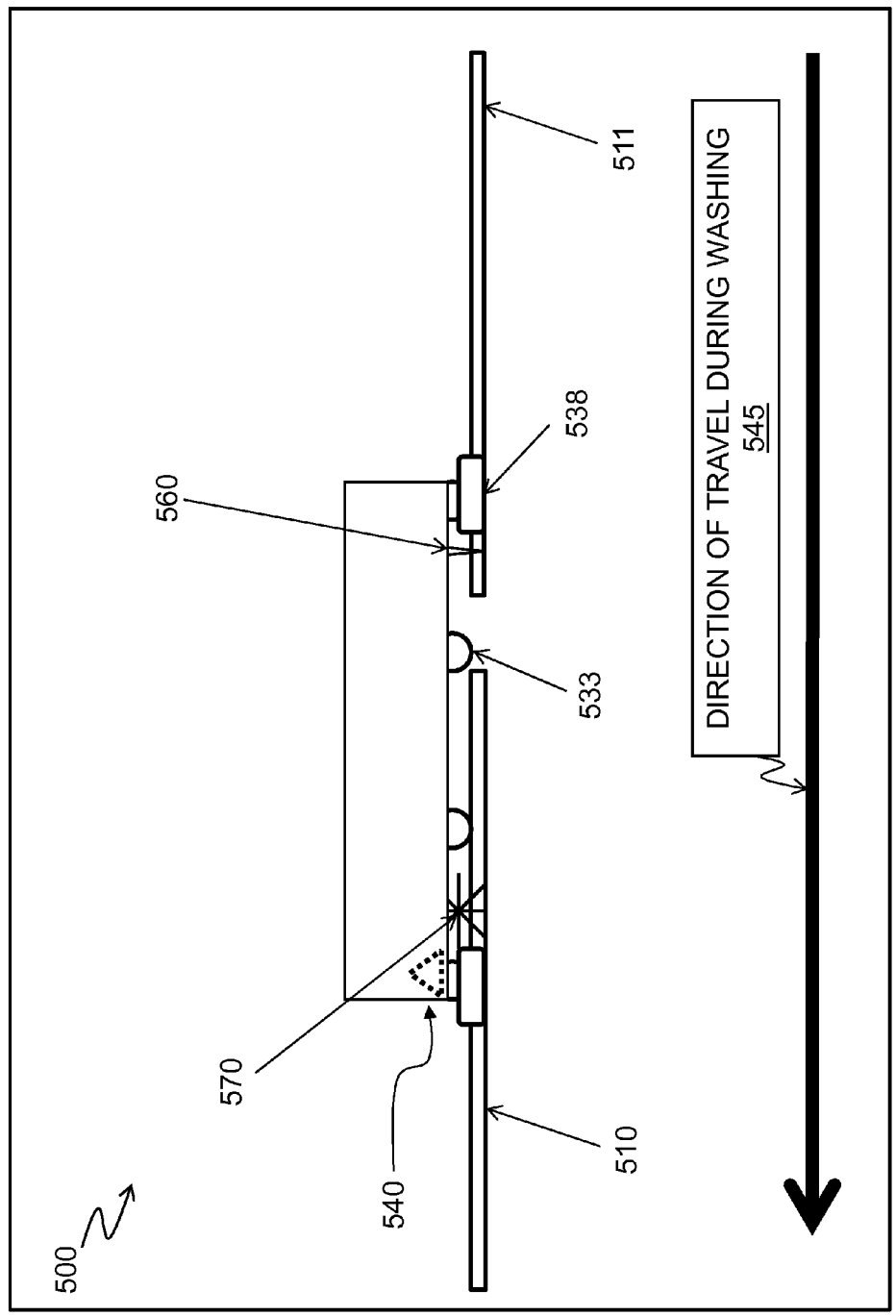
FIG. 5 depicts a side view of an exemplary embodiment of a cleaning vehicle.

Reference is made to FIG. 5 to illustrate the side view of an embodiment of a solar collector cleaning vehicle 500 traversing from an initial solar collector 511 to an adjacent solar collector 510. Drive wheels 533 may generally propel the cleaning vehicle 500 across the surface of an initial solar collector 511 to an adjacent solar collector 510. In some embodiments, the drive wheels 533 may function as guide wheels 538. In other embodiments, the vehicle may be in motion and a fluid dispersal element 540 may disperse a cleaning fluid, e.g., water, onto a solar collector. A fluid removal element 560, e.g., a squeegee, may be used to remove the fluid, along with any dirt from a solar collector 510,511. Some embodiments may have a surface agitator, such as a rod with filaments 570, to better remove dirt and fluid from the solar collectors 510,511. The embodiment of FIG. 5 depicts the cleaning vehicle 500 wherein one of the wheels 533 may be in a gap between the solar collectors 510,511 and where the balance of the cleaning vehicle 500 is maintained. Optional guide wheels 538 may be used to guide the cleaning vehicle in the director of travel 545 and may facilitate the moving of the cleaning vehicle across the solar collectors 510,511.

Figure 6C:
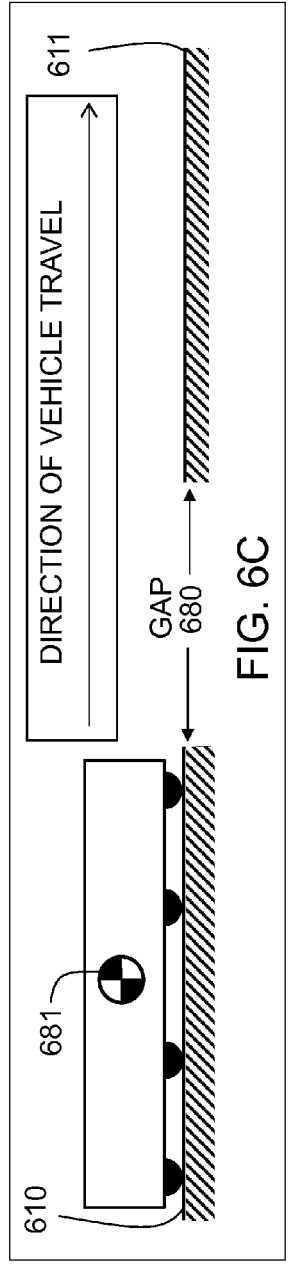
Figure 6D:
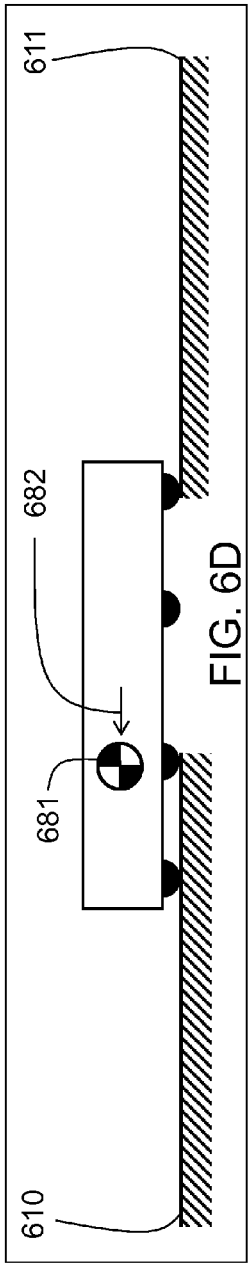
Figure 6E:
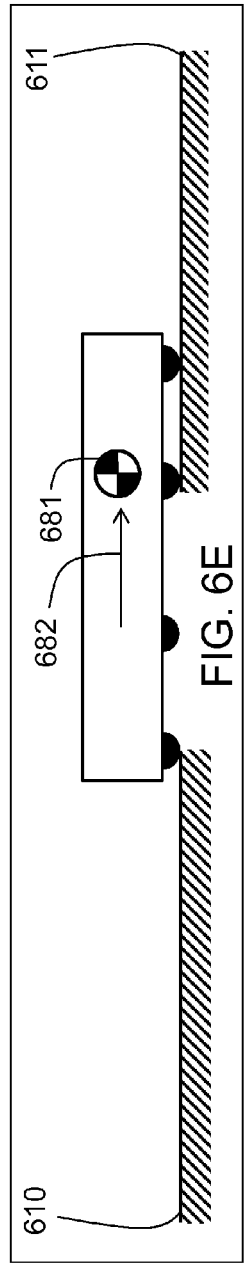
Figure 6F:
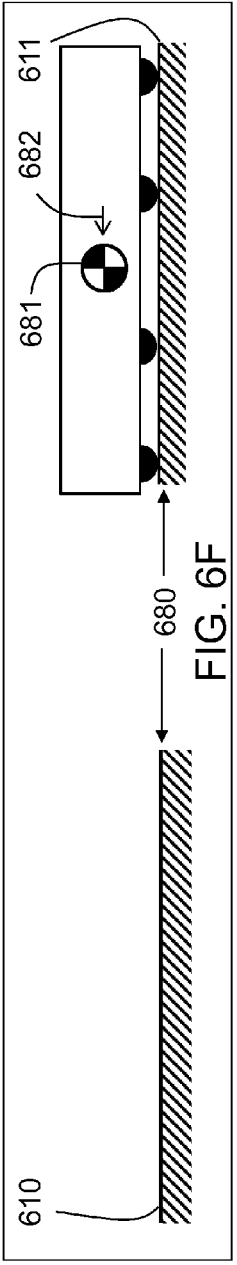

FIGS. 6A-6F depict an exemplary mechanism for moving an exemplary cleaning vehicle 620 from one solar collector to another solar collector via, e.g., wheels 624,625,626,627,628 and a wheel drive mechanism. The vehicle 620 may also be aided by other mechanisms. An exemplary cleaning vehicle 620 may not be able to traverse the gap between one solar collector and an neighboring solar collector if the distance 680 is greater than the distance between the position of the center of mass of the vehicle 681 and the nearest distal wheel. In some embodiments, the forward wheel 624 and rear wheel 628 may be extended to lengthen the vehicle (FIG. 6B). This extension may be a permanent or a temporary action to aid the cleaning vehicle in spanning a larger gap. In other embodiments, the gap-spanning ability may be improved by shifting 682 the center of mass 681 of the cleaning vehicle 620, which may allow it to span larger gaps without modifying the dimensions of the cleaning vehicle (FIGS. 6C-6F). The shift in the center of mass may be accomplished by moving certain components within the vehicle, e.g., the batteries and cleaning fluid reservoir. To aide in traversing among widely spaced solar collectors 610,611, bridges may be positioned (not shown), where the bridges may be platforms on which the vehicle drives, or a cable from which it attaches and hangs as it spans the gap between solar collectors.

Figure 7:
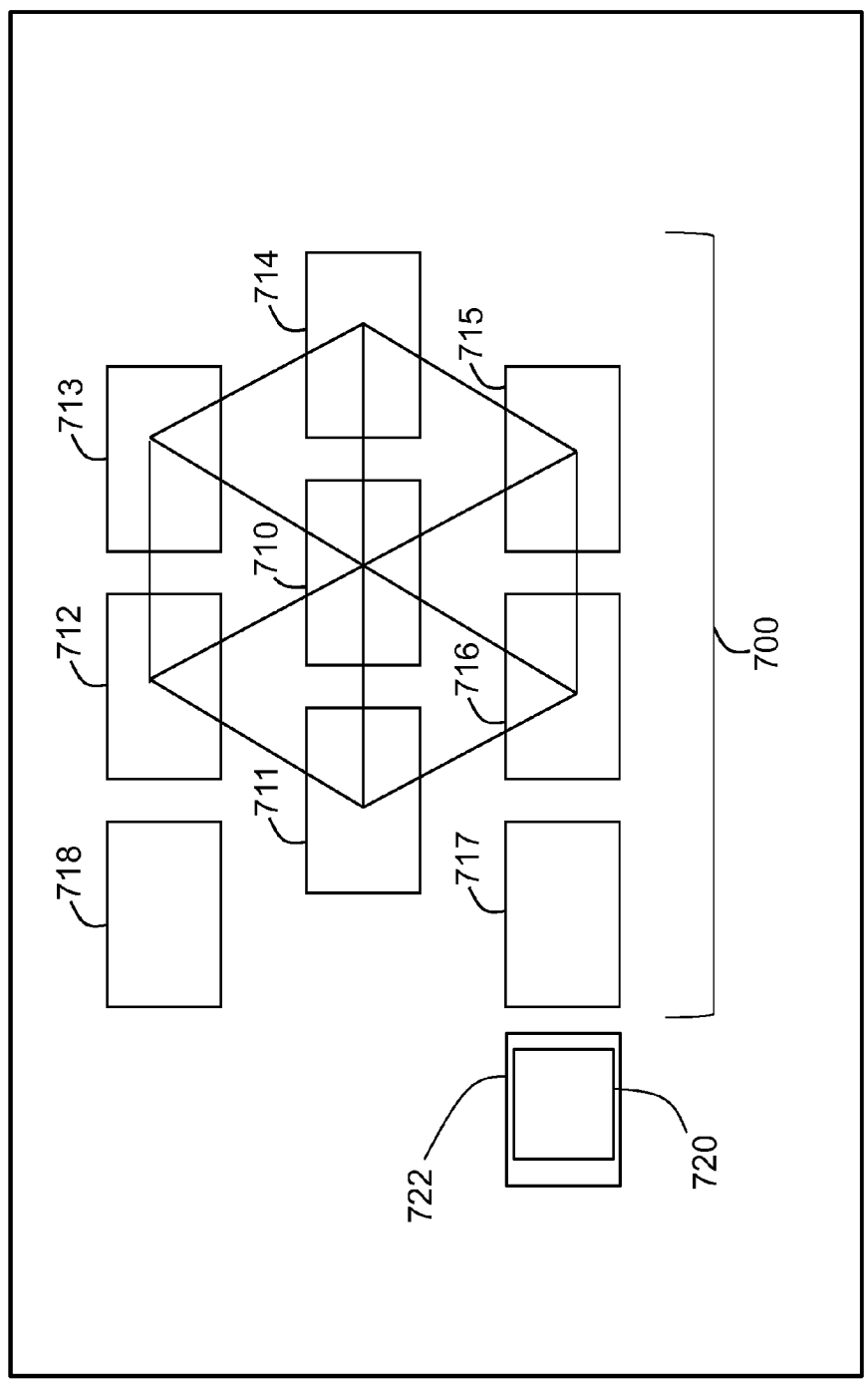
FIG. 7 depicts an exemplary embodiment of a solar collector array.

FIG. 7 illustrates an exemplary solar collector array 700. Solar collectors may be arranged in a hexagonal close pack, such that non-edge solar collectors, as exemplified by solar collector 710, may be surrounded by six neighboring solar collectors 711-716. Such solar collectors may be equidistant from neighboring solar collectors 711-716. In some embodiments, solar collectors 710-718 may be reoriented to allow cleaning vehicles to move from one solar collector row to another solar collector row without an operator. In other embodiments, a mobile docking station, such as a nurse vehicle (FIG. 11), may transport cleaning vehicles to neighboring solar collectors 711-716, e.g., when the distance between the solar collectors is too great to traverse. Also shown is an optional docking station 722 with an exemplary cleaning vehicle 720.

Figure 8:
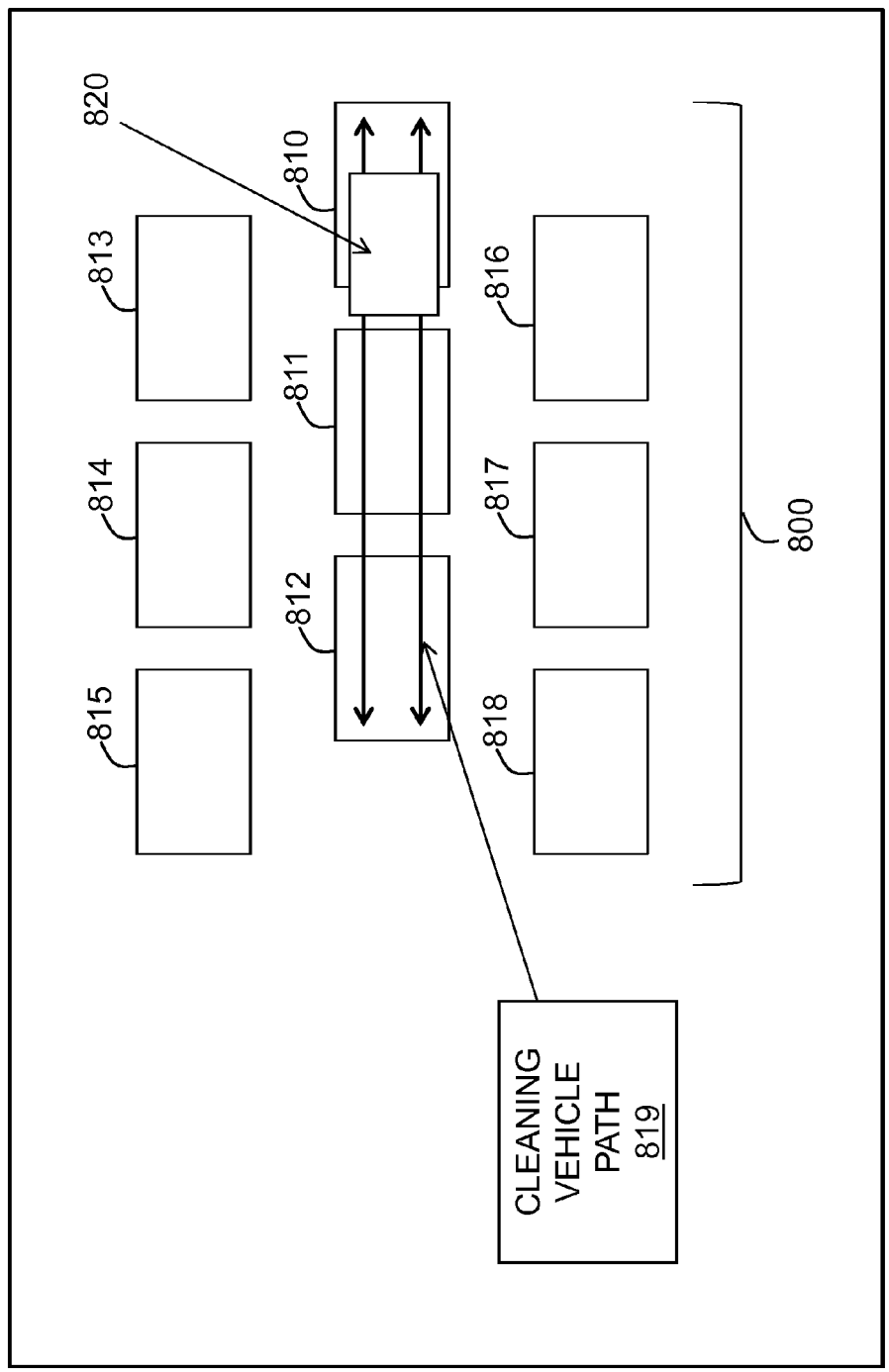
FIG. 8 depicts an exemplary embodiment of a cleaning vehicle.

FIG. 8 illustrates a top level system 800 where a row of solar collectors 810,811,812 may provide a pathway 819 for a cleaning vehicle 820. An exemplary pathway may occur when solar collectors 810-812 are oriented in rows in a horizontal position. This may allow the cleaning vehicle to move across the surface of a row of solar collectors 810-812. As the cleaning vehicle 820 moves across the solar collectors 810-812, the cleaning vehicle may clean the surface area of each of the solar collectors 810-812 by applying fluid to the surface and drying the surface area by removing the mixture of fluid and surface dirt. A cleaning vehicle 820 may interact with a solar collector array 810-812, because the array may act as a pathway. A vehicle may control the solar collector field 810-818 the vehicle is cleaning, e.g., via a cleaning system controller, which may be a local node in a control network, in order to move one or more solar collectors as necessary for cleaning and ambulation. The cleaning system controller, e.g., a computer, with a processor may command the field into various positions, and may also command cleaning vehicles and coordinate operations. A cleaning system controller may also maintain data on real-time cleanliness based on solar collectors cleaned. As depicted in FIG. 8, the cleaning vehicle embodiment may be configured to move in one of two directions, e.g., forward and backward directions, and may be configured to clean in one direction or both directions.

Figure 9A:
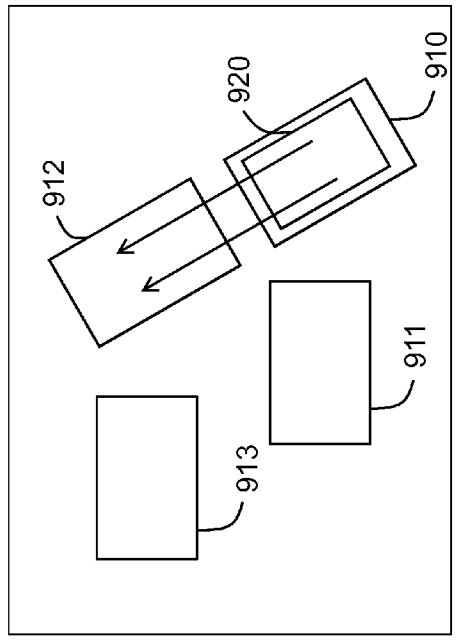
FIGS. 9A-9D depicts an exemplary embodiment showing a solar collector turning to allow a cleaning vehicle to move from one row of solar collectors to another.
Figure 9B:
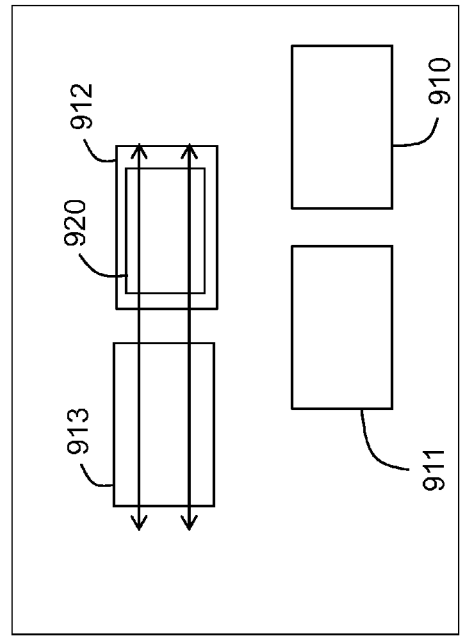
Figure 9C:
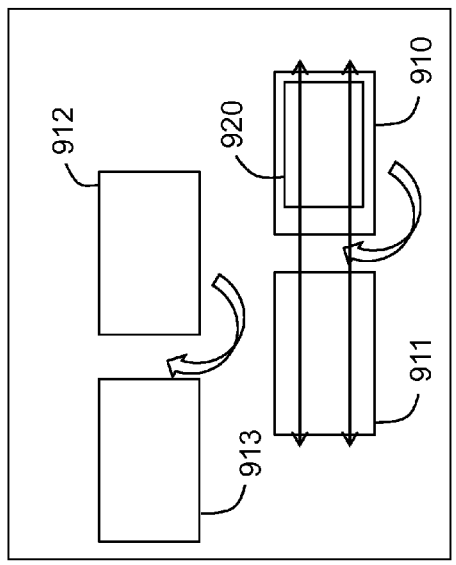
Figure 9D:
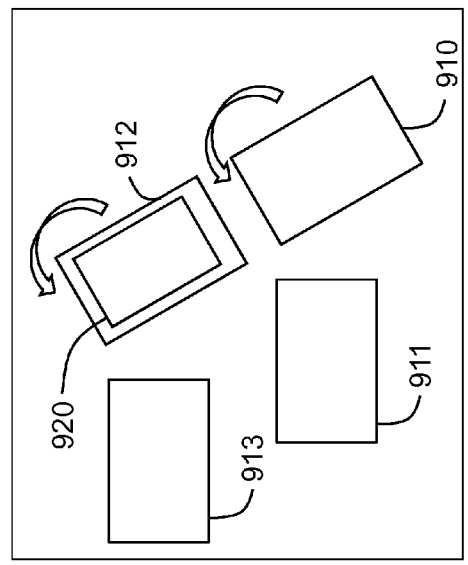

FIGS. 9A-9D illustrate a top level system 900 where an embodiment of a vehicle 920 may be traversing from an initial solar collector 910 to a final solar collector 912 in an adjacent row. While on an initial solar collector 910 the cleaning vehicle 920 may stop and wait for the solar collector 910 to turn and align itself with the adjacent final solar collector 912 (FIG. 9A). Once the solar collector 910 is aligned with the adjacent final solar collector 912 (FIG. 9B), the vehicle 920 may move from the initial solar collector 910 to the adjacent final solar collector 912 (FIG. 9C). A cleaning vehicle 920 may then wait until a solar collector 912 has turned to align itself with a solar collector 913 in the new row (FIG. 9D). A cleaning vehicle 920 may then clean the solar collector 912 and other solar collectors in the new row 913. The alignment of the solar collectors 910-913 and the movement of the cleaning vehicle 920 may be controlled via a wireless link to a controller (not shown) or autonomously via a position sensor (not shown) and on-board processing (not shown).

FIG. 10 illustrates, in an exemplary graph 1000, a means for a system to track the position of a cleaning vehicle (not shown). An exemplary embodiment may use a tracking element on a cleaning vehicle, such as a compass or an object detector circuit. A sensor on a cleaning vehicle above a solar collector may detect a reflection of a beam of light 1092 indicating that the cleaning vehicle is on a solar collector 1090. When a sensor on a cleaning vehicle is between solar collectors, no beam of light is reflected, indicating a vehicle may be between solar collectors 1091, i.e., encountering or traversing a gap. A vehicle may then count the number and direction of solar collectors it has traversed by monitoring a compass and counting gaps traversed via output from an object detector circuit. Other embodiments may include sensors for gap detection such as: optical sensors; mechanical whiskers; and/or sonar transceivers. Some embodiments may use a global positioning element, such as a Global Positioning System (GPS), to monitor the position of a cleaning vehicle in an array of solar collectors. In some embodiments, the sensor may detect whether the fluid dispersal element and/or fluid removal element are above a solar collector, and the cleaning vehicle may actuate these components and/or turn them on or off. In other embodiments, the cleaning vehicle may have forward looking sensors to detect an edge, e.g., an end of a row of solar collectors, or a solar collector that is out of place.

Figure 11:
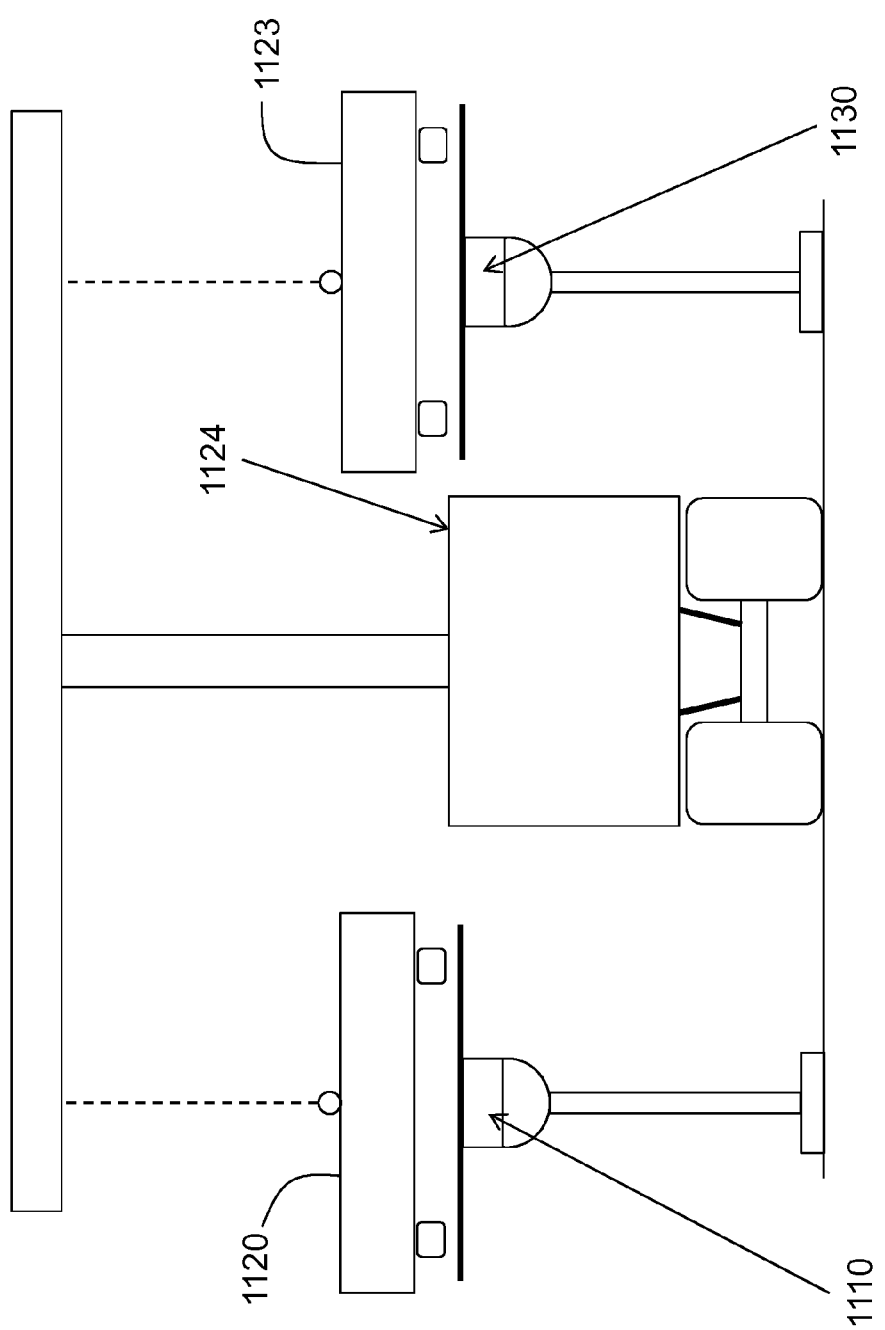
FIG. 11 depicts an exemplary cleaning vehicle carrier system.

Solar collector fields and cleaning systems may be configured to permit operator-less contact cleaning of the solar collectors. A solar collector field may provide a roadway for a cleaning vehicle. FIG. 11 illustrates an exemplary cleaning vehicle carrier 1124, e.g., a nurse vehicle, depicted as a mobile device that may travel between arrays of solar collectors and deploy and retract one or more cleaning vehicles 1120,1123 onto and from the surfaces of solar collectors 1110,1130.

A cleaning system may incorporate a dock on the edges of solar collector fields, which a cleaning vehicle may automatically navigate to for cleaning fluid refills, recharging, and/or refueling. Automated recharging, refueling, and/or cleaning fluid refilling may allow for minimal human interaction on a continuous or continual basis. In other embodiments, the docks may be mobile, may deposit the cleaning vehicles onto the solar collectors, and may recharge and/or refill at a central location with one or more mobile docks.

A computer may incorporate additional information such as time of year, site specific dirt accumulation rates, current and predicted weather, electrical power pricing, and current and future plant operation into cleaning strategies optimized for reducing the levelized cost of electricity. A computer may cause the cleaning vehicles to focus on particular regions of a solar collector field to minimize the cleaning effort needed to achieve maximum performance from the solar collector field.

A cleaning system may be fault tolerant in that an exemplary cleaning system controller may route the cleaning vehicles around solar collectors that have known failures. A controller may also re-route a cleaning vehicle around a newly discovered failed solar collector. The detection, by the solar collector cleaning vehicle, of a newly discovered failed solar collector, e.g., one that fails to align for traversal by the cleaning vehicle, or one that may have a broken surface, may also be reported by the cleaning vehicle to the controller of the array of heliostats, or solar collectors, to which the failed solar collector is a member. A vehicle, or cleaning system controller, may detect dew and accomplish additional cleaning when dew is present because of the reduced cleaning fluid, e.g., water, requirements. A vehicle may also be used to remove dew from solar collectors.

Another exemplary embodiment may reuse a cleaning fluid, which may be filtered, after it is removed by a fluid removal element. The fluid may further be analyzed for purity. The results of the on-board analysis may be used to determine the relative soiling of the solar collector and more or less effort may be expended depending on the results of the analysis.

A vehicle may also act in an adaptive cleaning manner, e.g., depending on the results, in which a vehicle may monitor the cleanliness of a solar collector after cleaning and exert a varying level of cleaning effort: e.g., changes in surface agitator speed; vehicle speed; and/or use of cleaning fluid. For example, a vehicle may monitor the strength of a signal reflecting from a surface of a solar collector via an object detector circuit to determine the minimal level of cleaning effort required to clean a solar collector array.

A cleaning vehicle may be powered by a storage device, e.g., a battery, that may be recharged when a cleaning vehicle is docked at a home station or engaging a mobile docking station, e.g., a nurse vehicle. An embodiment of a cleaning vehicle may be equipped with a solar panel for recharging the cleaning vehicle. Additionally, embodiments of the cleaning vehicle may be powered by a fuel cell, or combustion engine.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A cleaning vehicle comprising:
   a chassis;
   a plurality of drive wheels attached to the chassis; and
   a fluid removal element attached to the chassis, wherein the fluid removal element is configured to remove at least one of: a cleaning fluid, dew, and dirt from a surface of a solar collector of a plurality of solar collectors;
   a processor having an addressable memory, wherein the processor is configured to:
     command at least one of the plurality of drive wheels to move in at least one of: a forward direction and a backward direction;
     command at least one solar collector of the plurality of solar collectors into a new position;
     track a position of the cleaning vehicle by at least one of: a compass, a global positioning system, an object detector circuit, an optical sensor, a mechanical whisker, a sonar transceiver, and a gap counting sensor;
     detect a failed solar collector, wherein a failed solar collector is at least one of: a solar collector with a broken surface, a solar collector with movement limited in at least one axis, and a solar collector that does not respond to a command to move into a new position;
     store a location of a detected failed solar collector; and
     determine a cleaning path for the cleaning vehicle through the plurality of solar collectors, wherein the determined cleaning path avoids stored locations of detected failed solar collectors.

2. The cleaning vehicle of claim 1 further comprising:
a battery disposed in the chassis; and
a solar panel disposed on at least one surface of the chassis, wherein the solar panel is configured to charge the battery.

3. The cleaning vehicle of claim 1 further comprising:
a fluid dispersal element attached to the chassis, wherein the fluid dispersal element is configured to dispense a cleaning fluid onto the surface of a solar collector of the plurality of solar collectors; and
a cleaning fluid reservoir disposed in the chassis, wherein the cleaning fluid reservoir is configured to store the cleaning fluid.

4. The cleaning vehicle of claim 3 further comprising:
a fluid recovery element, wherein the fluid recovery element is configured to filter dirt from at least one fluid removed by the fluid removal element and store the filtered fluid in the cleaning fluid reservoir.

5. The cleaning vehicle of claim 3 further comprising:
a surface agitator attached to the chassis, wherein the surface agitator is interposed between the fluid dispersal element and the fluid removal element.

6. The cleaning vehicle of claim 3 further comprising:
at least one guiding element, wherein the at least one guiding element is disposed perpendicular to the plurality of drive wheels, and the at least one guiding element extends from the chassis to an edge of a solar collector of the plurality of solar collectors.

7. The cleaning vehicle of claim 1, wherein the processor is configured to: detect an edge, via a forward looking sensor, of at least one solar collector of the plurality of solar collectors.

8. The cleaning vehicle of claim 3, wherein the processor is configured to: determine when at least one of: a battery of the cleaning vehicle is low and the cleaning fluid level is low; and
determine a path for the cleaning vehicle through the plurality of solar collectors to a dock.

9. The cleaning vehicle of claim 1, wherein the processor is configured to:
store information on at least one of: time of year, site specific dirt accumulation rates, current weather, predicted weather, electrical power pricing, current plant operation, and planned future plant operation;
analyze cleaning fluid removed by a fluid removal element;
maintain data on real-time solar collector field cleanliness, wherein real-time solar collector field cleanliness is based on at least one of: stored information and analyzed cleaning fluid for at least one solar collector of the plurality of solar collectors; and
determine a cleaning strategy, wherein the cleaning strategy is based on the maintained data.

10. The cleaning vehicle of claim 9, wherein the processor is further configured to:
detect a presence of dew on at least one solar collector of the plurality of solar collectors; and
modify the cleaning strategy to incorporate additional cleaning if presence of dew is detected.

11. A cleaning vehicle comprising:
a chassis;
a plurality of drive wheels attached to the chassis;
a fluid removal element attached to the chassis, wherein the fluid removal element is configured to remove at least one of: a cleaning fluid, dew, and dirt from a surface of a solar collector of a plurality of solar collectors; and
a processor having addressable memory, wherein the processor is configured to:
determine, via an object detector circuit, a strength of a signal reflected off of a solar collector of the plurality of solar collectors by a sensor disposed on the bottom of the chassis; and
modify, based on the strength of the signal reflected, a cleaning effort of the cleaning vehicle, wherein the cleaning effort is at least one of: a speed of the surface agitator, a speed of the cleaning vehicle by the plurality of drive wheels, a dispensing of the cleaning fluid by the fluid dispersal element, and an amount of the cleaning fluid dispensed by the fluid dispersal element.

12. The cleaning vehicle of claim 11 further comprising:
a battery disposed in the chassis; and
a solar panel disposed on at least one surface of the chassis, wherein the solar panel is configured to charge the battery.

13. The cleaning vehicle of claim 11 further comprising:
a fluid dispersal element attached to the chassis, wherein the fluid dispersal element is configured to dispense a cleaning fluid onto the surface of a solar collector of the plurality of solar collectors; and
a cleaning fluid reservoir disposed in the chassis, wherein the cleaning fluid reservoir is configured to store the cleaning fluid.

14. The cleaning vehicle of claim 13 further comprising:
a fluid recovery element, wherein the fluid recovery element is configured to filter dirt from at least one fluid removed by the fluid removal element and store the filtered fluid in the cleaning fluid reservoir.

15. The cleaning vehicle of claim 13 further comprising:
a surface agitator attached to the chassis, wherein the surface agitator is interposed between the fluid dispersal element and the fluid removal element.

16. The cleaning vehicle of claim 13 further comprising:
at least one guiding element, wherein the at least one guiding element is disposed perpendicular to the plurality of drive wheels, and the at least one guiding element extends from the chassis to an edge of a solar collector of the plurality of solar collectors.

17. The cleaning vehicle of claim 11, wherein the processor is further configured to:
detect an edge, via a forward looking sensor, of at least one solar collector of the plurality of solar collectors.

18. The cleaning vehicle of claim 13, wherein the processor is further configured to:
determine when at least one of: a battery of the cleaning vehicle is low and the cleaning fluid level is low; and
determine a path for the cleaning vehicle through the plurality of solar collectors to a dock.

19. The cleaning vehicle of claim 11, wherein the processor is further configured to:
store information on at least one of: time of year, site specific dirt accumulation rates, current weather, predicted weather, electrical power pricing, current plant operation, and planned future plant operation;
analyze cleaning fluid removed by a fluid removal element;
maintain data on real-time solar collector field cleanliness, wherein real-time solar collector field cleanliness is based on at least one of: stored information and analyzed cleaning fluid for at least one solar collector of the plurality of solar collectors; and
determine a cleaning strategy, wherein the cleaning strategy is based on the maintained data.

20. The cleaning vehicle of claim 19, wherein the processor is further configured to:

detect a presence of dew on at least one solar collector of the plurality of solar collectors; and
modify the cleaning strategy to incorporate additional cleaning if presence of dew is detected.

21. A cleaning vehicle comprising:
a chassis;
a plurality of drive wheels attached to the chassis;
a fluid removal element attached to the chassis, wherein the fluid removal element is configured to remove at least one of: a cleaning fluid, dew, and dirt from a surface of a solar collector of a plurality of solar collectors;
a fluid dispersal element attached to the chassis, wherein the fluid dispersal element is configured to dispense a cleaning fluid onto the surface of a solar collector of the plurality of solar collectors;
a cleaning fluid reservoir disposed in the chassis, wherein the cleaning fluid reservoir is configured to store the cleaning fluid;
a surface agitator attached to the chassis, wherein the surface agitator is interposed between the fluid dispersal element and the fluid removal element; and
a processor having addressable memory, wherein the processor is configured to:
detect an edge of a first solar collector, wherein the edge is proximate to an open region between a first solar collector and a second solar collector;
disengage the surface agitator proximate to the edge of the first solar collector;
disengage the fluid removal element proximate to the edge of the first solar collector;
traverse the open region between the first solar collector and the second solar collector;
detect an edge of the second solar collector, wherein the edge is proximate to the open region between the first solar collector and the second solar collector;
engage the surface agitator proximate to the edge of the second solar collector; and
engage the fluid removal element proximate to the edge of the second solar collector.

22. The cleaning vehicle of claim 21 further comprising:
a battery disposed in the chassis; and
a solar panel disposed on at least one surface of the chassis, wherein the solar panel is configured to charge the battery.

23. The cleaning vehicle of claim 21 further comprising:
a fluid recovery element, wherein the fluid recovery element is configured to filter dirt from at least one fluid removed by the fluid removal element and store the filtered fluid in the cleaning fluid reservoir.

24. The cleaning vehicle of claim 21 further comprising:
at least one guiding element, wherein the at least one guiding element is disposed perpendicular to the plurality of drive wheels, and the at least one guiding element extends from the chassis to an edge of a solar collector of the plurality of solar collectors.

25. The cleaning vehicle of claim 21, wherein the processor is further configured to:
detect an edge, via a forward looking sensor, of at least one solar collector of the plurality of solar collectors.

26. The cleaning vehicle of claim 21, wherein the processor is further configured to:
determine when at least one of: a battery of the cleaning vehicle is low and the cleaning fluid level is low; and
determine a path for the cleaning vehicle through the plurality of solar collectors to a dock.

27. The cleaning vehicle of claim 21, wherein the processor is further configured to:
store information on at least one of: time of year, site specific dirt accumulation rates, current weather, predicted weather, electrical power pricing, current plant operation, and planned future plant operation;
analyze cleaning fluid removed by a fluid removal element;
maintain data on real-time solar collector field cleanliness, wherein real-time solar collector field cleanliness is based on at least one of: stored information and analyzed cleaning fluid for at least one solar collector of the plurality of solar collectors; and
determine a cleaning strategy, wherein the cleaning strategy is based on the maintained data.

28. The cleaning vehicle of claim 27, wherein the processor is further configured to:
detect a presence of dew on at least one solar collector of the plurality of solar collectors; and
modify the cleaning strategy to incorporate additional cleaning if presence of dew is detected.

* * * * *